(12) United States Patent
Williams et al.

(10) Patent No.: US 6,260,806 B1
(45) Date of Patent: Jul. 17, 2001

(54) METHOD AND APPARATUS FOR USING A MOMENTUM BIAS TO PROVIDE SPACECRAFT ATTITUDE STABILIZATION DURING AN ECLIPSE

(75) Inventors: Paul D. Williams, San Pedro; Jeremiah O. Salvatore, Redondo Beach; Troy D. Wallace, Redondo Beach; Christopher D. Olsen, Redondo Beach, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/325,526

(22) Filed: Jun. 3, 1999

(51) Int. Cl.[7] ..................................................... B64G 1/24
(52) U.S. Cl. ......................................... 244/164; 168/171
(58) Field of Search ................................... 244/164, 165, 244/169, 168, 171, 173; 701/13

(56) References Cited

U.S. PATENT DOCUMENTS

| | | | |
|---|---|---|---|
| 3,471,105 | * 10/1969 | Yarber et al. | 244/165 |
| 3,995,801 | * 12/1976 | Bond | 244/158 R |
| 4,078,748 | * 3/1978 | Sen | 244/165 |
| 4,691,882 | * 9/1987 | Young | 244/158 R |
| 4,725,024 | * 2/1988 | Vorlicek | 244/165 |
| 4,735,382 | * 4/1988 | Pinson | 244/165 |
| 5,337,981 | * 8/1994 | Bender | 244/165 |
| 5,890,679 | * 4/1999 | Chethik | 244/158 R |

OTHER PUBLICATIONS

S. Rangarajan, "Novel Experiences with Insat–1B Operations", Spaceflight Dynamics 1993, vol. 84, Part II, Advances in the Astronomical Sciences.

\* cited by examiner

*Primary Examiner*—Galen L. Barefoot
(74) *Attorney, Agent, or Firm*—T. Gudmestad

(57) ABSTRACT

The attitude of a spacecraft is controlled during an eclipse without the dependence on auxiliary power by configuring the spacecraft so that it will receive solar power after solar eclipse is passed. The spacecraft is then oriented with respect to a sun line. The spacecraft is then spun so that it maintains a desired angular momentum throughout the eclipse and provides passive stabilization of the attitude. After the eclipse has passed, the spacecraft power is restored and the spacecraft attitude is detected. All spacecraft units are then powered up and thereafter, normal on-station attitude is re-established and normal spacecraft operations are established.

20 Claims, 2 Drawing Sheets

METHOD AND APPARATUS FOR USING A MOMENTUM BIAS TO PROVIDE SPACECRAFT ATTITUDE STABILIZATION DURING AN ECLIPSE

TECHNICAL FIELD

The present invention relates to attitude stabilization of a spacecraft during an eclipse. More specifically, the present invention relates to attitude stabilization of a spacecraft during an eclipse through the use of a momentum bias.

BACKGROUND ART

Currently, all spacecraft require constant power from an electrical power source to support the operation of control actuators, to power the payload, to maintain thermal stability, and to control a host of other functions. An example of such a spacecraft, employs a reaction wheel system that is configured in a pyramid for attitude control while utilizing photovoltaic arrays for electrical power. An inherent limitation of this system and others that rely on electrical power is that these systems cannot be used during a solar eclipse without the use of an auxiliary power source.

Accordingly, all current spacecraft require some source of stored electrical power or auxiliary power to maintain their subsystem functionalities during an eclipse in addition to requiring an electric power source to support the operation of normal spacecraft functions. These stored or auxiliary power sources include, for example, batteries or other similar devices. Currently, if a spacecraft does not utilize some source of stored or auxiliary power to control its attitude, the spacecraft will lose power upon entering an eclipse, potentially causing the spacecraft attitude to deteriorate to a state causing permanent damage to vital spacecraft systems. Moreover, these spacecrafts that carry auxiliary power sources, such as batteries, carry additional weight which can decrease the payload capacity and also increase the cost of manufacturing and operation of the spacecraft. Therefore, a spacecraft that can maintain stability through an eclipse without the need for auxiliary power would be desirable.

While the use of a momentum bias to induce passive attitude stabilization in a spacecraft is well known, there are, however, no known methods or apparatus that utilize a momentum bias for eclipse storage on a spacecraft without dependence on auxiliary power. Moreover, there are no known methods or apparatus that utilize a momentum bias for eclipse storage on a spacecraft that is designed to be actively controlled in three axis during periods of sunlight.

SUMMARY OF THE INVENTION

It is an object of the present invention to provide a spacecraft that provides passive attitude control of the spacecraft during a solar eclipse through the use of an angular momentum bias.

It is another object of the present invention to provide attitude control of a spacecraft during an eclipse without the need for a stored or auxiliary power source.

It is a further object of the present invention to provide a spacecraft that eliminates the need for an auxiliary power source to maintain subsystem functionalities during a solar eclipse by providing for thermal protection of the subsystem functionalities so that they will operate following the solar eclipse.

In accordance with these and other objects of the present invention, a method for controlling the attitude of a spacecraft without dependence on auxiliary power during a solar eclipse is provided. In anticipation of the solar eclipse, the spacecraft is configured so that it will receive solar power prior to and following the solar eclipse. The spacecraft is then spun to a desired rate of rotation and a desired angular momentum about a stable or neutrally stable body axis (the axes of maximum or minimum moment of inertia, respectively). The spacecraft is spun so that it maintains the desired angular momentum throughout the eclipse and provides passive stabilization of the attitude. After the solar eclipse has passed, the spacecraft power is restored and the spacecraft attitude is known. All spacecraft units are then powered up and thereafter, normal on-station attitude is re-established and normal spacecraft operations are established.

These and other features and advantages of the present invention will become apparent from the following description of the invention, when viewed in accordance with the accompanying drawings and appended claims.

BEST MODE(S) FOR CARRYING OUT THE INVENTION

Figure 1:
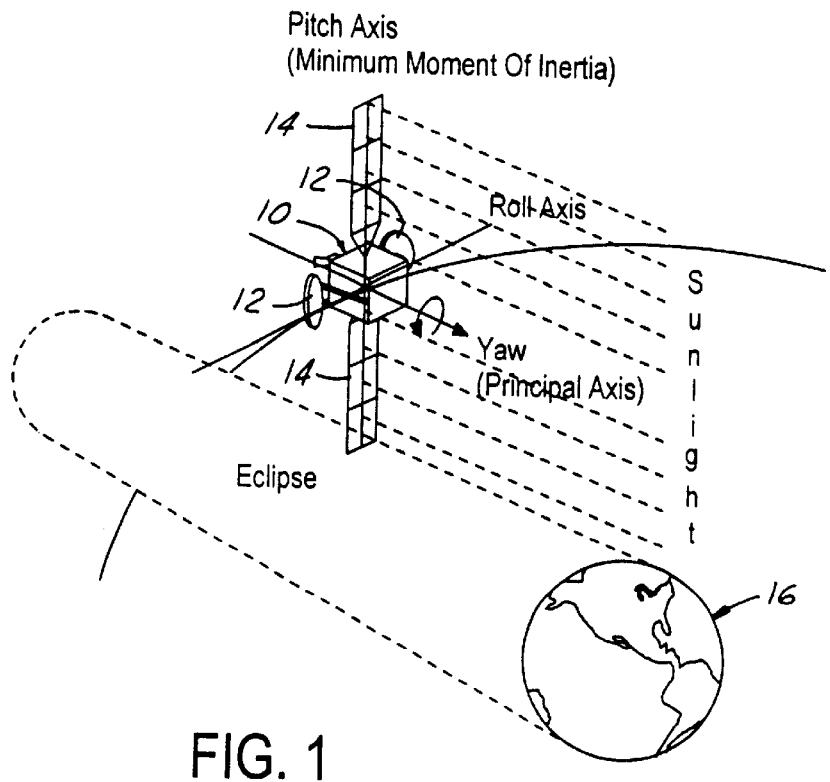
FIG. 1 is a perspective view of a spacecraft with an active, three-axis, attitude control system invention spun about an axis of minimum moment of interia in accordance with a preferred embodiment of the present.

Turning now to FIG. 1, which illustrates a spacecraft 10 positioned with respect to a pitch axis, a roll axis, and a yaw axis. The spacecraft of the present invention is preferably incorporated into a satellite, however, any spacecraft may be utilized. The spacecraft 10 preferably has a plurality of reflectarrays antennas 12 and a plurality of solar panels or wings 14. The spacecraft 10 is orbiting about the Earth 16 and receives sunlight at the plurality of solar panels 14.

Active, three-axis, stabilized spacecraft require a continuous supply of electrical power to operate. Attitude control actuators, control processors, and sensor processing electronics are examples of attitude control components that rely on electrical power. Spacecraft that utilize solar power for normal operations often employ the use of electrical storage devices that provide a source of power during the eclipse season. Without such storage devices, the spacecraft attitude will not be able to be controlled. Although the severity of the resulting attitude anomaly will depend on the control system configuration, an attitude anomaly will nonetheless occur that can result in permanent damage to spacecraft units or the entire spacecraft itself. Damage to spacecraft units will usually be a result of some thermal limit being exceeded.

Figures 2, 3:
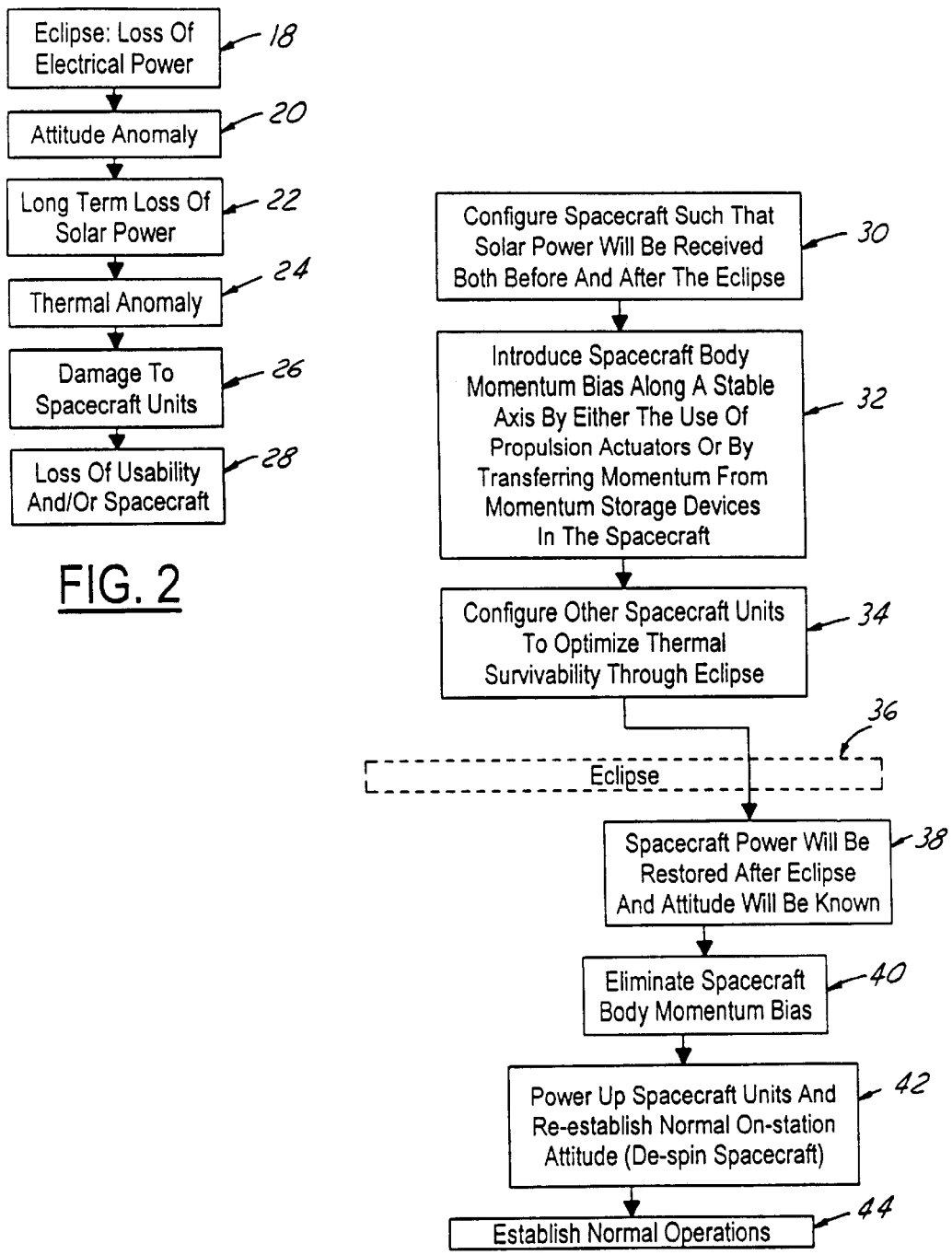
FIG. 2 is a schematic flow chart diagrammatically illustrating the disadvantages encountered by prior spacecraft during an eclipse.
FIG. 3 is a schematic flow chart diagrammatically illustrating the operation of a spacecraft in accordance with a preferred embodiment of the present invention.

FIG. 2 shows an example of a fault tree, emanating from the loss of sunlight, resulting in permanent spacecraft damage. As generally indicated by reference number 18, a solar eclipse will cause the spacecraft 10 to lose solar power and therefore external electrical power as the Earth 16 blocks the line of sun to the plurality of solar panels 14. This loss of electrical power will result in an attitude anomaly, as generally indicated by reference number 20. If the spacecraft 10 has no device for storing solar power or for providing auxiliary power, then as the solar eclipse continues, the spacecraft 10 will suffer long term loss of solar power, as generally indicated by reference number 22. The long term loss of solar power will result in a thermal anomaly and loss of controllability, as generally represented by reference number 24. The thermal anomaly will result in damage to spacecraft units, as indicated by reference number 26. The resulting damage will result in loss of usability of the spacecraft 10 and/or loss of the spacecraft 10 altogether, as is indicated by reference number 28.

The present invention eliminates the need for any apparatus for electrical power storage. In general, the need for electrical power storage is eliminated by establishing a momentum bias in the spacecraft 10 that will fix the attitude, inertially, for some duration of time. This momentum bias can be established by storing momentum in an internal wheel or other momentum storage apparatus or by spinning up the spacecraft body itself. As is discussed in more detail below, at the onset of the solar eclipse, all electrical power derived from the sun will be lost. However, in accordance with the present invention, no attitude anomaly will occur. The inertial rigidity due to the momentum bias will allow the spacecraft 10 to exit the eclipse in the same attitude that it entered. Once in the sunlight, all the electrical based functions of the spacecraft 10 can be restored.

It is well known to those of ordinary skill in art, the timing and duration of the eclipse season as well as each individual eclipse. It is also well known to those of skill in the art, that the timing and duration of the orbit eclipse season will vary depending upon the altitude or orbit of a given spacecraft. In the preferred embodiments, discussed below, the spacecraft 10 is a geosynchronous satellite that orbits at an altitude where the duration of the eclipse season as well as each individual eclipse is known. However, it should understood that the present invention may be used at any given orbit and with a variety of different types of satellites.

Referring now to FIG. 3, which illustrates a preferred method for controlling the attitude of a spacecraft in accordance with a preferred embodiment of the present invention. At the onset of a solar eclipse, the spacecraft 10 is configured such that its solar wings 14 will receive solar power before the spacecraft 10 enters the eclipse and after the eclipse has passed, as generally indicated by reference number 30. The spacecraft 10 then has a momentum bias introduced into the spacecraft body along a stable axis, as generally indicated by reference number 32.

The momentum bias is preferably introduced into the spacecraft body through the use of populsion actuators or momentum storage devices in the spacecraft such as internal wheels. The location to which the spacecraft 10 is spun will vary. For example, if the spacecraft is at an attitude where the eclipse season lasts for 45 days, the spacecraft is preferably configured such that its spin axis is pointed 22½ degrees ahead of the sun so that after the eclipse season has passed, the spin axis will be positioned 22½ degrees behind the sun. After the momentum bias is introduced to the spacecraft, the other spacecraft units are configured to optimize thermal survivability, i.e., resistance to cold, through the duration of the eclipse, as is generally indicated by reference number 34.

It should be understood, that the order in which these events occur may change, just so long as they all occur before the solar eclipse, which is generally indicated by reference number 36. Without these steps, when a solar eclipse occurs, the problems such as illustrated in FIG. 2 would occur. Once the momentum bias has been created in the spacecraft 10 and it is rotating at a desired rate of rotation with a desired angular momentum, the thrusters or other momentum biasing apparatus are turned off. Once the thrusters are turned off, the spacecraft 10 will maintain its angular momentum throughout the duration of the eclipse and thereby be passively stabilized.

After the eclipse 36 has passed and solar power is received at the solar wings 14, the power to the spacecraft 10 is restored, as generally indicated by reference number 38. After the power is restored, the attitude of the spacecraft 10 will be known. The attitude should be the same after the eclipse as it was during the eclipse. The momentum bias of the spacecraft body 10 is then eliminated, as generally indicated by reference number 40. Thereafter, the spacecraft units are powered back up and normal on-station attitude is re-established, as generally indicated by reference number 42. The other spacecraft units, include for example, the payload and bus units. After the other units are powered back up and the normal attitude has been re-established, the normal operations of the spacecraft 10 is re-established, as generally indicated by reference number 44.

It should be understood that the present inventon can be used to store a satellite for an entire eclipse season or can be used such that partial use of the spacecraft payload is provided during the eclipse season. If the spacecraft 10 is to be stored for the entire eclipse season, it should be configured such that it is spun about the axis of maximum moment of inertia, such as is shown in FIG. 1.

Figure 4:
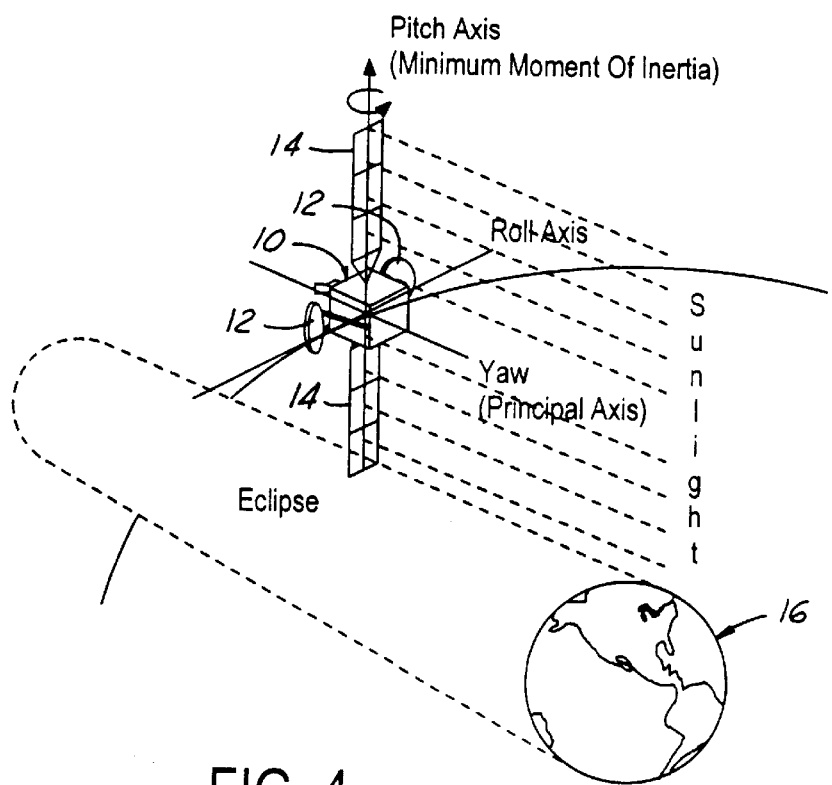
FIG. 4 is a perspective view of a spacecraft with an active, three-axis, attitude control system spun about an axis of maximum moment of interia in accordance with a preferred embodiment of the present invention.

In accordance with another preferred embodiment of the present invention, the spacecraft 10 may be stored during each individual eclipse, such that partial use of the spacecraft is available during the eclipse season, i.e., between eclipses. In order to store the spacecraft 10 to survive the individual eclipses, the same steps 30 to 44 (illustrated in FIG. 3 and described above) are performed. The only difference in this preferred embodiment, is that the momentum bias is established in the spacecraft body along the minimum axis of rotation. Spinning the spacecraft body about the minimum axis of rotation will only work at an altitude where the eclipse are relatively short in duration, as schematically shown in FIG. 4. It should be understood, that the spacecraft 10 may also be spun about the maximum moment of inertia for storage during each individual eclipse.

Because the duration of some eclipses at some altitudes are too long in length, rotation about the minimum axis of inertia may not be preferable. The characteristics of bodies rotating about their minimum axis of inertia dictates that over a relatively short duration (a single eclipse at geosynchronous altitude) the attitude of the bodies will remain relatively fixed. However, over a relatively long duration, the attitude of bodies spinning about their minimum axis of inertia will eventually diverge. Therefore, it should be understood that in some cases the momentum bias should be induced about any stable axis, as dictated by the length of the eclipses at a given altitude. The only requirement regarding the spin axis is that the solar wings 14 must always be provided with solar power.

Having now fully described the invention, it will be apparent to one of ordinary skill in the art that many changes and modifications can be made thereto without departing from the spirit or scope of the invention as set forth herein.

What is claimed is:

1. A method for controlling the attitude of a spacecraft without dependence on auxiliary power during a solar eclipse, comprising:

configuring said spacecraft to receive said solar power before said solar eclipse onset and after said solar eclipse passage;

configuring said spacecraft to receive said solar power before said solar eclipse onset and after said solar eclipse passage;

spinning said spacecraft to a desired rate of rotation and angular momentum about a spin axis;

maintaining said angular momentum throughout said solar eclipse;

receiving said solar power at said spacecraft after said solar eclipse has passed;

eliminating said desired rate of rotation and angular momentum, re-establishing normal on-station attitude; and establishing normal spacecraft operations.

2. The method of claim 1, further comprising:

configuring a plurality of other spacecraft units prior to said solar eclipse to optimize thermal survivability through said solar eclipse.

3. The method of claim 2, wherein said step of configuring said spacecraft is accomplished by stepping a plurality of solar panels associated with said spacecraft so that insure that said solar power is received at said spacecraft after said solar eclipse.

4. The method of claim 3, wherein said spacecraft is stored in passive stabilization throughout an eclipse season.

5. The method of claim 4, wherein said spin axis is oriented before said solar eclipse to a predetermined angle with respect to the sun.

6. The method of claim 3, wherein said spacecraft is stored for the duration of each solar eclipse and is therefore partially useable during an eclipse season.

7. The method of claim 6, wherein said spacecraft is oriented before said eclipse such that said spin axis is pointed at the sun.

8. The method of claim 4, wherein said spin axis of said spacecraft is about said maximum moment of inertia.

9. The method of claim 6, wherein said spin axis of said spacecraft is about said minimum moment of inertia.

10. The method of claim 2, wherein said step of spinning said spacecraft is accomplished by a plurality of thrusters.

11. The method of claim 2, wherein said step of spinning said spacecraft is accomplished by a momentum storage devices.

12. A method for controlling the attitude of a spacecraft during a solar eclipse, comprising:

configuring said spacecraft to receive solar power both before and after said solar eclipse;

introducing spacecraft body momentum bias along a stable axis;

configuring a plurality of other spacecraft units to optimize thermal survivability during said solar eclipse;

restoring said spacecraft power after said solar eclipse;

eliminating said spacecraft body momentum bias;

powering up said plurality of other spacecraft units;

re-establishing normal on-station attitude; and establishing normal operations.

13. The method of claim 12, wherein said spacecraft body momentum is introduced through the use of propulsion actuators.

14. The method of claim 12, wherein said spacecraft body momentum is introduced through the use of a momentum storage device located inside of said spacecraft.

15. The method of claim 12, wherein said stable body axis is a maximum moment of inertia.

16. The method of claim 12, wherein said stable body axis is a minimum moment of inertia.

17. The method of claim 15, wherein said spacecraft is stored through an entire eclipse season.

18. The method of claim 16, wherein said spacecraft is stored during a plurality of individual eclipses during an entire eclipse season.

19. A method for controlling the attitude of a spacecraft during a solar eclipse, comprising:

configuring said spacecraft to receive solar power both before and after said solar eclipse;

introducing spacecraft body momentum bias along a stable axis;

restoring said spacecraft power after said solar eclipse;

eliminating said spacecraft body momentum bias;

establishing normal operations for said spacecraft.

20. The method of claim 19, further comprising:

configuring a plurality of other spacecraft units to optimize thermal survivability during said solar eclipse.

* * * * *